United States Patent [19]

Beach et al.

[11] 4,330,432

[45] May 18, 1982

[54] CATALYST COMPOSITION

[75] Inventors: David L. Beach, Gibsonia; Richard W. Lunden, Pittsburgh, both of Pa.; Adolfo Zambelli, Milan, Italy

[73] Assignee: Gulf Research & Development Company, Pittsburgh, Pa.

[21] Appl. No.: 220,313

[22] Filed: Dec. 29, 1980

[51] Int. Cl.$^3$ .............................................. C08F 4/64
[52] U.S. Cl. .......................... 252/429 C; 252/431 R; 252/431 C
[58] Field of Search ............ 252/429 C, 431 R, 431 C

[56] References Cited

U.S. PATENT DOCUMENTS 3,901,863  8/1975  Berger et al. ............... 252/429 C X
4,199,476  4/1980  Melquist et al. ............ 252/429 C X

*Primary Examiner*—Patrick Garvin
*Attorney, Agent, or Firm*—Deane E. Keith; Forrest D. Stine; Joseph J. Carducci

[57] ABSTRACT

A novel catalyst composition comprising (A) the solid reaction product of (1) at least one non-halide-containing organic oxygenated compound of magnesium, (2) at least one non-halide-containing organic oxygenated titanium compound and (3) an aluminum halide; (B) an activator; and (C) at least one non-halide-containing organic oxygenated titanium compound.

32 Claims, No Drawings

CATALYST COMPOSITION

BACKGROUND OF THE INVENTION

1. Field of the Invention

This invention relates to a novel catalyst composition comprising (A) the solid reaction product of (1) at least one non-halide-containing organic oxygenated compound of magnesium, (2) at least one non-halide-containing organic oxygenated titanium compound and (3) an aluminum halide; (B) an activator; and (C) at least one non-halide-containing organic oxygenated titanium compound.

2. Description of the Prior Art

In U.S. Pat. No. 3,901,863 to Berger et al there is disclosed a catalyst composition suitable for the polymerization of olefinic monomers comprising (A) the solid reaction product of (1) at least one non-halide containing organic oxygenated compound of a metal selected from the metals of Groups Ia, IIa, IIb, IIIb, IVb, VIIa, and VIII of the Periodic Table with (2) at least one non-halide-containing organic oxygenated transition compound of a transition metal selected from the metals of Groups IVa, Va and VIa of the Periodic Table and (3) an aluminum halide and (B) an activator.

SUMMARY OF THE INVENTION

We have found that if we add a critical amount of at least one non-halide-containing organic oxygenated titanium compound to a catalyst composition comprising (A) the solid reaction product of (1) at least one non-halide-containing organic oxygenated compound of magnesium, (2) at least one non-halide-containing organic oxygenated titanium compound and (3) an aluminum halide and (B) an activator, the activity of the novel resultant catalyst composition is greatly increased over the base catalyst composition. Thus, when the novel catalyst system defined and claimed herein is used to polymerize ethylene, the polymer yield is greatly increased over the same catalyst system but without the added non-halide-containing organic oxygenated titanium compound.

In preparing the solid reaction product component of our novel catalyst composition, the same magnesium compounds disclosed by Berger et al can be used. Thus, mention can be made of the following non-halide-containing organic oxygenated compounds of magnesium: (1) the alkoxides thereof, such as methylates, ethylates, isopropylates, n-butylates, isobutylates, methoxyethylates, hydroxymethylates, etc.; (2) the phenates thereof, such as salts of phenic acid, naphthenes, anthracenates, phenanthrenates, cresolates, etc.; (3) the salts of carboxylic acids, such as acetates, butanoates, laurates, pivolates, crotonates, phenylacetates, benzoates, malonates, adipates, sebacates, phthalates, mellitates, acrylates, oleates, maleates, etc.; (4) the chelates, such as the enolates, particularly the acetylacetonates; etc. Of these we prefer magnesium alkoxides, phenates and acetylacetonates, but, most preferably, magnesium alkoxides and acetylacetonates. Specific examples of such non-halide-containing organic oxygenated compounds of magnesium that can be used herein include magnesium methoxide, magnesium ethoxide, magnesium n-propoxide, magnesium iso-propoxide, magnesium n-butoxide, magnesium iso-butoxide, magnesium sec-butoxide, magnesium t-butoxide, magnesium pentoxide, magnesium phenoxide, magnesium naphthenate, magnesium anthracenate, magnesium phenanthrenate, magnesium o-cresolate, magnesium m-cresolate, magnesium p-cresolate, magnesium acetate, magnesium phenylacetate, magnesium benzoate, magnesium butanoate, magnesium laurate, magnesium pivalate, magnesium crotonate, magnesium malonate, magnesium adipate, magnesium sebacate, magnesium phthalate, magnesium mellitate, magnesium acrylate, magnesium oleate, magnesium maleate, magnesium gluconate, magnesium salicylate, magnesium cyclohexanebutyrate, magnesium stearate, magnesium acetylacetonate, magnesium 8-hydroxyquinoline, etc., and mixtures thereof.

Also used to prepare the solid reaction product component of our novel catalyst composition are the same non-halide-containing organic oxygenated titanium compounds disclosed by Berger et al, including (1) the alkoxides thereof, such as methylates, isopropylates, n-butylates, methoxyethylates, hydroxymethylates, etc.; (2) the phenates thereof, such as salts of phenic acid, naphthenates, anthracenates, phenanthrenates, cresolates, etc.; (3) the chelates, such as the enolates, particularly the acetylacetonates; etc. Of these we prefer titanium alkoxides. Specific examples of such non-halide-containing organic oxygenated titanium compounds that can be used herein include titanium tetra(methoxide) titanium tetra(ethoxide), titanium tetra(n-propoxide), titanium tetra (iso-propoxide), titanium tetra(n-butoxide), titanium tetra (iso-butoxide), titanium tetra(sec-butoxide), titanium tetra (t-butoxide), titanium tetra(pentoxide), titanium tetra(phenoxide), titanium tetra(naphthenate), titanium tetra(anthracenate), titanium tetra(phenanthrenate), titanium tetra(o-cresolate), titanium tetra(m-cresolate), titanium tetra(p-cresolate), titanium tetra(acetate), titanium tetra(phenylacetate), titanium tetra(benzoate), titanium tetra(butanoate), titanium tetra (salicylate), titanium bis(acetylacetonate), etc., and mixtures thereof.

The third compound used to prepare the solid reaction component of our novel catalyst composition is an aluminum halide similar to those employed by Berger et al, particularly a hydrocarbyl aluminum halide, such as an alkyl or aryl aluminum chloride or bromide. The chlorinated and brominated aluminum compounds can be defined by the following formula:

$$Al(R_1R_2R_3)_n X_{3-n},$$

wherein each of $R_1$, $R_2$, and $R_3$ is a hydrocarbyl radical as defined hereinafter with respect to the activator, Component (B), X is chloride or bromide and n is any number greater than or equal to zero but less than three.

Specific examples of chlorinated and brominated aluminum compounds that can be used include: aluminum trichloride, aluminum ethyl dichloride, aluminum diethyl monochloride, aluminum isobutyl dichloride, aluminum di-isobutyl monochloride, aluminum diphenyl monochloride, aluminum dibenzyl monochloride, ethyl aluminum sesquichloride, aluminum n-butyl dichloride, aluminum di-n-butyl monochloride, aluminum secbutyl dichloride, aluminum di-sec-butyl monochloride, aluminum propyl dichloride, aluminum dipropyl monochloride, etc. and the corresponding bromides and mixtures thereof. Of these the following chlorinated and brominated aluminum compounds are preferred: aluminum trichloride, aluminum ethyl dichloride, aluminum diethyl monochloride, ethyl aluminum sesquichloride, aluminum dibutyl monochloride, aluminum butyl dichloride, etc. and the corresponding bromides, and aluminum tribromide.

The process used to prepare the solid reaction product (A) using components (A) (1), (A) (2) and (A) (3), including the recovery thereof, defined can be similar to the process of Berger et al. In a preferred embodiment the three components are used such that the molar ratios of the three components, that is, the magnesium compound, the titanium metal compound and the aluminum halide, based on the elemental portion thereof, will be in the range of about 1.0:0.01:0.1 to about 1.0:10.0:10.0, preferably in the range of about 1.0:0.05:0.5 to about 1.0:5.0:5.0, respectively, in the solid reaction product. The process, in the preferred embodiment, is carried out in the liquid phase, with or without an added organic diluent, such as isobutane, n-butane, n-pentane, n-heptane, cyclohexane, benzene, toluene, etc., in a temperature range of about 20° to about 250° C., preferably about 30° to about 150° C., and a pressure of about 14 to about 100 pounds per square inch gauge (about 96.5 to about 689.5 kPa), preferably ambient pressure (atmospheric), for about 0.5 to about six, preferably about one to about three.

The activator, Component (B), can include organic compounds of aluminum or magnesium. As examples of such compounds, those falling within the formulae $AlR_4R_5R_6$ and $MgR_7R_8$ can be used. In each of the above R groups, $R_1-R_8$, the same or different, is a hydrocarbyl radical selected from the groups consisting of saturated or unsaturated, straight or branched chain alkyl radicals having from one to 24 carbon atoms, preferably from one to 10 carbon atoms, aryl radicals having from six to 20 carbon atoms, preferably from six to 10 carbon atoms, alkenyl radicals having from one to 30 carbon atoms, preferably from one to 20 carbon atoms, cycloalkyl radicals having from three to 40 carbon atoms, preferably from three to 30 carbon atoms, and aralkyl and alkaryl radicals having from six to 40 carbon atoms, preferably from six to 30 carbon atoms. Of these organic compounds of aluminum are preferred. Specific examples of such compounds include trimethylaluminum, triethylaluminum, tri-n-propylaluminum, tri-iso-propylaluminum, tri-n-butylaluminum, tri-sec-butylaluminum, tri-iso-butylaluminum, trihexylaluminum, diethylbutylaluminum, tricyclohexylaluminum, trioctylaluminum, tri(2-methylpentyl) aluminum, triisopropenylaluminum, tribenzylaluminum, phenyldiethylaluminum, diethylmagnesium, di-n-propylmagnesium, di-iso-propylmagnesium, di-n-butylmagnesium, di-sec-butylmagnesium, di-iso-butylmagnesium, dihexylmagnesium, dicyclohexylmagnesium, ethylbutylmagnesium, diphenylmagnesium, dibenzylmagnesium, etc., and mixtures thereof.

The amount of activator, Component (B), used relative to the solid reaction product, Component (A), is not critical and can be varied over wide limits. Thus, the amounts of each present in the novel catalyst system are such that the molar ratios thereof, based on the elements titanium in Component (A) to aluminum or magnesium in Component (B), or the activator, will be in the range of about 1:1 to about 1:100, preferably about 1:10 to about 1:50.

In preparing the novel catalyst system defined and claimed herein there is added to the solid reaction product and the activator defined above a critical amount of a non-halide-containing organic oxygenated titanium compound, Component (C), such as, for example, the non-halide-containing organic oxygenated titanium compound used to prepare solid reaction product (A) defined above. The non-halide-containing organic oxygenated titanium compound can be defined, for example, by the following formula:

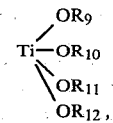

wherein $R_9$, $R_{10}$, $R_{11}$ and $R_{12}$, the same or different, can be a hydrocarbyl radical such as defined above with reference to the organic compounds of aluminum and magnesium. The same specific titanium compounds listed above in preparing the solid reaction product can also represent the added titanium compound.

In order to obtain the novel catalyst composition of increased activity claimed herein, it is critical that the amount of the latter titanium compound added to the solid reaction product be such that the molar ratio of said latter titanium compound to the titanium compound used to prepare the solid reaction product be in the range of about 10:1 to about 500:1, preferably in the range of about 50:1 to about 250:1. The novel catalyst system is simply prepared by physical admixture of Components (A), (B) and the added titanium compound, Component (C).

The novel catalyst system is useful in the polymerization of olefins with a terminal unsaturation whose molecules contains from two to 20 carbon atoms, such as ethylene, propylene, butene-1, 4-methylpentene-1, hexene-1, decene-1, hexadecene-1, etc., particularly ethylene.

The polymerization of olefins using the novel catalyst herein can be carried using any known or conventional procedure, for example, following the procedure of Berger et al. Thus, the polymerization can be carried out in solution, suspension or in a gaseous phase wherein the olefinic, for example, ethylenic, partial pressure can be in the range of about 14 to about 2000 pounds per square inch gauge (about 96 to about 13,790 kPa), preferably in the range of about 100 to about 1000 pounds per square inch gauge (about 689 to about 6895 kPa), and a temperature in the range of about 20° to about 250° C., preferably in the range of about 50° to about 120° C., over a period of about 0.5 to about six, preferably about two to about four, hours, if the reaction is carried out as a batch process. Additionally, if desired, the reaction can be carried out continuously using the same reaction conditions.

Although the molar ratio of the added titanium in Component (C) to the titanium in Component (A) is critical, as pointed out above, the amount of catalyst used is not critical. Thus, the concentration of the catalyst composition in the polymerization zone can be maintained in the range of about 0.001 to about 20, preferably about 0.01 to about 10, grams per liter or reactor volume.

The polymerization reaction herein can be carried out in the additional presence of hydrogen, wherein its partial pressure can be in the range of about 10 to about 500 pounds per square inch gauge (about 69 to about 3448 kPa), preferably in the range of about 20 to about 250 pounds per square inch gauge (about 138 to about 1724 kPa). When the novel catalyst herein is used to polymerize an olefin, for example, ethylene, the activity thereof is unexpectedly increased when the polymerization is carried out in the additional presence of hydrogen.

The recovery of the olefinic polymer and the removal of carrier and catalyst residue therefrom can be effected following any conventional procedure. Thus, the carrier can be flashed from the reaction product and the latter can then be washed with a suitable solvent, such as methanol, to remove catalyst residue, if desired.

The process for polymerizing ethylene using the novel catalyst composition herein is claimed in our copending application Ser. No. 220,314, entitled Process for Polymerizing Ethylene filed concurrently herewith.

DESCRIPTION OF PREFERRED EMBODIMENTS

Several runs were carried out as follows.

EXAMPLE I

Twenty grams of magnesium bis(acetylacetonate) and 0.6 milliliters of titanium tetra(isopropoxide) were dissolved in 50 milliliters of boiling anhydrous toluene under a nitrogen atmosphere. One hundred eighty milliliters of a 25 weight percent solution of ethyl aluminum dichloride in n-heptane was added dropwise to the above, with stirring, and the reaction mixture was refluxed at about 100° C. and ambient pressure for two hours. The reaction product was then filtered off under vacuum, washed three times with 100 milliliters of dry toluene and dried in vacuuo. Twelve and one-half grams of a solid reaction product were obtained. This solid reaction product was analyzed and found to contain 16.51 weight percent magnesium, 60.25 weight percent chlorine, 1.80 weight percent titanium, and 4.89 weight percent aluminum. There was added to dry n-heptane 2.5 milliliters of triethyl-aluminum and 0.03 gram (0.0083 millimol) of the above solid reaction product and the resulting mixture was introduced under vacuum into a one-liter autoclave, maintained at 50° C., and stirred pneumatically. The autoclave was then pressured to 90 pounds per square inch gauge (620 kPa) with ethylene, and the reaction was allowed to continue for three hours while keeping the pressure constant by further addition of ethylene as needed. The autoclave was then depressured and the reaction product stirred into one liter of isopropyl alcohol acidified to a pH of about 4.0 with hydrochloric acid. The solid polyethylene was filtered off, washed with methanol and dried at 70° C. under vacuum.

EXAMPLE II

This run was similar to Example I, except that in place of the solid reaction product in the catalyst system there was used 0.3 milliliter (1.01 millimol of titanium tetra(iso-propoxide).

EXAMPLE III

This run is similar to Example I except that a selected amount of titanium tetra(isopropoxide) was added to the solid reaction product and triethyl aluminum catalyst system. Thus, there was added to the one-liter autoclave, maintained in this case at 52° C., 0.2 milliliter of titanium tetra(isopropoxide) and 2.5 grams of triethyl aluminum under a nitrogen atmosphere. Hydrogen was then added to a pressure of 40 pounds per square inch gauge (276 kPa) followed by the addition of ethylene to a total pressure of 90 pounds per square inch gauge. The reaction was allowed to proceed for 0.16 hour and then 0.020 gram of the solid reaction product was added thereto. The reaction was continued for an additional 1.84 hours, during which time additional ethylene was added to maintain the total pressure at 90 pounds per square inch gauge.

EXAMPLE IV

This run was similar to Example III, except that 0.024 gram of the solid reaction product and 0.3 milliliter of titanium tetra(isopropoxide) were used in the catalyst system.

EXAMPLE V

This run was also similar to Example III, except that 0.023 gram of the solid reaction product and 0.5 milliliter of titanium tetra(isopropoxide) were used in the catalyst system.

EXAMPLE VI

Again this run was similar to Example III, except that 0.022 gram of the solid reaction product and 0.6 milliliter of titanium tetra(isopropoxide) were used in the catalyst system.

EXAMPLE VII

This run was similar to Example I except that 0.01 gram of the solid reaction product and 0.3 milliliter of titanium tetra(isopropoxide) were used in the catalyst system.

EXAMPLE VIII

This run was similar to Example VII except that, as in Example III hydrogen was initially added to a pressure of 26 pounds per square inch gauge (179 kPa), followed by the addition of ethylene to a total pressure of 90 pounds per square inch gauge. During the reaction period ethylene was added to maintain a total pressure of 90 pounds per square inch gauge.

The pertinent data was summarized below in Table I.

TABLE I

| Example | I | II | III | IV | V | VI | VII | VIII |
|---|---|---|---|---|---|---|---|---|
| Catalyst System | | | | | | | | |
| Solid Reaction Product, Gms | 0.03 | 0 | 0.020 | 0.024 | 0.023 | 0.022 | 0.01 | 0.01 |
| Titanium In Solid Reaction Product, Millimols (mm) | 0.0083 | 0 | 0.0075 | 0.0090 | 0.0086 | 0.0083 | 0.0028 | 0.0028 |
| Titanium tetra (isopropoxide) Added, Milliliters | 0 | 0.3 | 0.2 | 0.3 | 0.5 | 0.6 | 0.3 | 0.3 |
| Titanium Added, mm | 0 | 0.01 | 0.67 | 1.01 | 1.68 | 2.02 | 1.01 | 1.01 |
| Mol Ratio Titanium Added to Titanium | 0 | ∞ | 89 | 112 | 194 | 244 | 362 | 362 |

TABLE I-continued

| Example | I | II | III | IV | V | VI | VII | VIII |
|---|---|---|---|---|---|---|---|---|
| In Reaction Product Triethylaluminum, ml | 2.5 | 2.5 | 2.5 | 2.5 | 2.5 | 2.5 | 2.5 | 2.5 |
| Reaction Conditions | | | | | | | | |
| Ethylene Partial Pressure, PSIG | 90 | 90 | 50 | 50 | 50 | 50 | 90 | 64 |
| Hydrogen Partial Pressure, PSIG | 0 | 0 | 40 | 40 | 40 | 40 | 0 | 26 |
| Reaction Temperature, °C. | 50 | 50 | 52 | 52 | 52 | 52 | 50 | 50 |
| Total Reaction Time, Hours | 3 | 3 | 2 | 2 | 2 | 2 | 3 | 3 |
| Polymer Yield, Grams of Polyethylene Per Gram of Titanium In Solid Reaction Product | 37,594 | 24 | 59,167 | 71,528 | 128,502 | 117,929 | 330,827 | 406,015 |
| Branches On Polyethylene Per 1000 Carbon Atoms | <2 | 11 | 31 | 37 | 86 | 155 | 29 | 45 |
| Intrinsic Viscosity, Tetralin, 135° C. | 14.996 | 4.652 | 1.284 | 2.705 | 5.211 | 3.991 | 5.156 | 2.750 |

The data in Table I clearly show the improvement obtained by the addition of selected critical amounts of (C) a non-halide-containing organic oxygenated titanium compound to a catalyst composition to a (A) the solid reaction product of (1) a non-halide-containing organic oxygenated compound of magnesium, (2) a non-halide-containing organic oxygenated titanium compound and (3) an aluminum halide and (B) an activator. Thus, in Example I when a catalyst composition containing solely Components (A) and (B) was employed to polymerize ethylene, 37,594 grams of polyethylene per gram of titanium were obtained. When Components (B) and (C) alone were employed only 24 grams of polyethylene per gram of titanium were obtained. Surprisingly, when a catalyst system containing each of Components (A), (B) and (C) were used in Examples III to VIII the activity of the catalyst was greatly increased. By controlling the rate of added titanium to titanium in the solid reaction product (A) the activity of the novel catalyst composition herein was carefully controlled. This is also unexpected in light of the teaching of Stampa et al in U.S. Pat. No. 3,953,552 wherein it would be expected therefrom that as the ratio of an added titanium compound to the titanium in an ethylene polymerization catalyst is increased (see Table I in column 4) the activity of the catalyst would thereby be decreased. An additional desirable feature of the novel catalyst system herein resides in the ability thereof to obtain branching in the polyethylene product. Comparing Example VII with Example VIII shows that when the novel catalyst herein is used to polymerize ethylene, the activity of the catalyst is unexpectedly increased when the polymerization is carried out in the additional presence of hydrogen.

Obviously, many modifications and variations of the invention, as hereinabove set forth, can be made without departing from the spirit and scope thereof, and, therefore only such limitations should be imposed as are indicated in the appended claims.

We claim:

1. A novel catalyst composition comprising (A) the solid reaction product of (1) at least one non-halide-containing organic oxygenated compound of magnesium selected from the group consisting of magnesium alkoxides, magnesium phenates, magnesium salts of carboxylic acids and magnesium chelates, (2) at least one non-halide-containing organic oxygenated titanium compound selected from the group consisting of titanium alkoxides, titanium phenates and titanium chelates and (3) an aluminum halide; (B) an activator selected from the group consisting of aluminum hydrocarbyls and magnesium hydrocarbyls; and (C) at least one non-halide-containing organic oxygenated titanium compound, selected from the group consisting of titanium alkoxides, titanium phenates and titanium chelates, wherein the molar ratio of the non-halide containing organic oxygenated titanium compound of Component (C) to the non-halide containing organic oxygenated titanium compound used to prepare the solid reaction product is in the range of about 10:1 to about 500:1.

2. The composition of claim 1 wherein the non-halide-containing organic oxygenated compound of magnesium is a magnesium alkoxide.

3. The composition of claim 1 wherein the non-halide-containing organic oxygenated compound of magnesium is a magnesium phenate.

4. The composition of claim 1 wherein the non-halide-containing organic oxygenated compound of magnesium is a magnesium salt of a carboxylic acid.

5. The composition of claim 1 wherein the non-halide-containing organic oxygenated compound of magnesium is a magnesium chelate.

6. The composition of claim 1 wherein the non-halide-containing organic oxygenated compound of magnesium is a magnesium enolate.

7. The composition of claim 1 wherein the non-halide-containing organic oxygenated compound of magnesium is magnesium bis(acetylacetonate).

8. The composition of claim 1 wherein the non-halide-containing organic oxygenated titanium compound used to prepare solid reaction product (A) is a titanium alkoxide.

9. The composition of claim 1 wherein the non-halide-containing organic oxygenated titanium compound used to prepare solid reaction product (A) is a titanium phenate.

10. The composition of claim 1 wherein the non-halide-containing organic oxygenated titanium compound used to prepare solid reaction product (A) is a titanium chelate.

11. The composition of claim 1 wherein the non-halide-containing organic oxygenated titanium compound used to prepare solid reaction product (A) is a titanium enolate.

12. The composition of claim 1 wherein the non-halide-containing organic oxygenated titanium compound used to prepare solid reaction product (A) is a titanium acetylacetonate.

13. The composition of claim 1 wherein the non-halide-containing organic oxygenated titanium compound used to prepare solid reaction product (A) is titanium tetra (isopropoxide).

14. The composition of claim 1 wherein the aluminum halide is aluminum chloride.

15. The composition of claim 1 wherein the aluminum halide is aluminum bromide.

16. The composition of claim 1 wherein the aluminum halide is an alkyl aluminum chloride.

17. The composition of claim 1 wherein the aluminum halide is ethyl aluminum dichloride.

18. The composition of claim 1 wherein the activator is an aluminum hydrocarbyl.

19. The composition of claim 1 wherein the activator is a magnesium hydrocarbyl.

20. The composition of claim 1 wherein the activator is triethylaluminum.

21. The composition of claim 1 wherein the activator is diethylmagnesium.

22. The composition of claim 1 wherein Component (C) is a titanium alkoxide.

23. The composition of claim 1 wherein Component (C) is a titanium phenate.

24. The composition of claim 1 wherein Component (C) is a titanium chelate.

25. The composition of claim 1 wherein Component (C) is a titanium enolate.

26. The composition of claim 1 wherein Component (C) is a titanium acetylacetonate.

27. The composition of claim 1 wherein Component (C) is titanium tetra (isopropoxide).

28. The composition of claim 1 wherein the non-halide-containing organic oxygenated compound of magnesium is a magnesium enolate, the non-halide-containing organic oxygenated compound used to prepare solid reaction product (A) is a titanium alkoxide, the aluminum halide is an alkyl aluminum chloride, the activator is an aluminum hydrocarbyl and Component (C) is a titanium alkoxide.

29. The composition of claim 1 wherein the non-halide-containing organic oxygenated compound of magnesium is magnesium bis (acetylacetonate), the non-halide-containing organic oxygenated compound used to prepare solid reaction product (A) is titanium tetra(isopropoxide), the aluminum halide is ethyl aluminum dichloride, the activator is triethylaluminum and Component (C) is titanium tetra(isopropoxide).

30. The composition of claim 1 wherein the molar ratios of components (A) (1), (A) (2) and (A) (3), based on the elemental portion thereof, are in the range of about 1.0:0.01:0.1 to about 1.0:10.0:10.0, respectively.

31. The composition of claim 1 wherein the molar ratios of components (A) (1), (A) (2) and (A) (3), based on the elemental portion thereof, are in the range of about 1.0:0.05:0.5 to about 1.0:5.0:5.0, respectively.

32. The composition of claim 1 wherein the molar ratio of the non-halide-containing organic oxygenated titanium compound of Component (C) to the non-halide-containing organic oxygenated titanium compound used to prepare the solid reaction product is in the range of about 10:1 to about 500:1.

* * * * *

UNITED STATES PATENT AND TRADEMARK OFFICE
CERTIFICATE OF CORRECTION

PATENT NO. : 4,330,432
DATED : May 18, 1982
INVENTOR(S) : David L. Beach, Richard W. Lunden, Adolfo Zambelli It is certified that error appears in the above—identified patent and that said Letters Patent is hereby corrected as shown below:

Column 4, line 59, "or" should read --- of ---.

Column 6, Table 1, Example II, across from Titanium Added, mm, "0.01" should read --- 1.01 ---.

Column 7, line 41, "rate" should read --- ratio ---.

Signed and Sealed this

Fourteenth Day of December 1982

[SEAL]

Attest:

GERALD J. MOSSINGHOFF

Attesting Officer

Commissioner of Patents and Trademarks